United States Patent
South et al.

(10) Patent No.: US 8,080,159 B2
(45) Date of Patent: Dec. 20, 2011

(54) CENTERTUBE FOR A COMBINATION FULL FLOW AND BYPASS FILTER APPARATUS

(75) Inventors: Kevin C. South, Cookeville, TN (US);
Abhijit Shimpi, Cookeville, TN (US);
Ismail Bagci, Cookeville, TN (US); Lee Currier, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 732 days.

(21) Appl. No.: 12/229,033

(22) Filed: Aug. 19, 2008

(65) Prior Publication Data

US 2010/0044298 A1 Feb. 25, 2010

(51) Int. Cl.
*B01D 27/08* (2006.01)
*B01D 35/30* (2006.01)
(52) U.S. Cl. .................................. 210/232; 210/457
(58) Field of Classification Search .................. 210/232, 210/433.1, 437, 457
See application file for complete search history.

(56) References Cited

U.S. PATENT DOCUMENTS

| | | | | |
|---|---|---|---|---|
| 2,743,018 A | * | 4/1956 | Belgarde | .................. 210/130 |
| 5,069,790 A | * | 12/1991 | Mordeki | .................. 210/323.1 |
| 5,447,627 A | | 9/1995 | Loafman et al. | |
| 5,665,231 A | | 9/1997 | Langsdorf et al. | |
| 5,695,637 A | | 12/1997 | Jiang et al. | |
| 5,885,314 A | | 3/1999 | Oussoren et al. | |
| 6,293,410 B1 | | 9/2001 | Forbes | |
| 6,447,567 B1 | | 9/2002 | Ehrenberg | |
| 6,478,958 B1 | | 11/2002 | Beard et al. | |
| 6,540,913 B1 | | 4/2003 | Guichaoua et al. | |
| 6,540,914 B1 | | 4/2003 | Smith | |
| 7,179,380 B2 | | 2/2007 | Merritt et al. | |
| 2004/0065203 A1 | * | 4/2004 | Rosenberg | .................. 96/69 |
| 2006/0124516 A1 | | 6/2006 | Merritt et al. | |
| 2007/0034559 A1 | * | 2/2007 | Beard et al. | .................. 210/203 |
| 2007/0125698 A1 | * | 6/2007 | Merritt et al. | .................. 210/450 |

OTHER PUBLICATIONS

"Notification of Transmittal of the International Search Report and the Written Opinion of the International Searching Authority, or the Declaration" for international patent application No. PCT/US2009/054255, dated Mar. 31, 2010.

* cited by examiner

*Primary Examiner* — Fred Prince
(74) *Attorney, Agent, or Firm* — Hamre, Schumann, Mueller & Larson, P.C.

(57) ABSTRACT

A filter apparatus for filtering fluid in an internal combustion engine, the filter apparatus including annular full flow filter media extending axially between a first end and a second end. The full flow filter media surrounds a reinforcing member which extends axially between the first end and the second end and includes a plurality of axially spaced apart circumferential connecting segments. The circumferential connecting segments extend between a plurality of substantially axially extending ribs which connect the reinforcing member to a radially inwardly spaced bypass tube. The reinforcing member also includes a plurality of flow apertures defined by the connecting segments and the ribs.

24 Claims, 13 Drawing Sheets

CENTERTUBE FOR A COMBINATION FULL FLOW AND BYPASS FILTER APPARATUS

TECHNICAL FIELD

The technical field relates to filter cartridges and filtration systems, preferably including replaceable filter elements.

BACKGROUND

The present invention relates generally to combination full flow and bypass filters.

A "clean" full-flow is advantageous for maintaining easy oil throughput during normal engine operation and especially during cold starts. A restricted full-flow impedes the flow of oil during a cold start. Consequently, there is an increase in the time to get oil to critical engine components and/or an excessive time that the filter bypass valve is open. Both situations (time delays and open bypass valves) are detrimental to engine health.

Prior to the development of combination full flow and bypass filters, engines generally employed one of two forms of filtration to clean the lubricating oil. One method is full-flow filtration and the other is combined full-flow and bypass filtration. Full-flow filtering elements receive and filter 90 to 100% of the regulated oil pump output prior to supplying the oil to the engine's lubrication system. Due to the need to filter a relatively high flow rate of oil, the full-flow filter is typically designed using more porous media than bypass filters. The higher porosity allows high oil throughput while yielding a desirably low pressure drop. Thus, the full-flow provides continuous engine protection by constantly removing relatively large particles.

Full flow filters are frequently augmented with bypass filters. Bypass filters, as indicated by their name, are placed in a flow path that bypasses the engine's main oil lubrication system. Typical bypass filters receive only five to ten percent of the regulated pump output, and serve to "superclean" the oil. "Supercleaning" is accomplished by use of a relatively low porosity media. To force oil through this tight media, high pressure oil is supplied to the bypass filter inlet while the filter's outlet is essentially at zero pressure (exit flow is routed to the non-pressurized oil pan). Hence, a high pressure differential drives the flow through the bypass filter. Since the bypass flow is pumped expressly for filtration and does not directly flow to the engine's main lubrication system, it is a parasitic pumping loss. To limit the amount of the parasitic bypass flow, a restrictive orifice is generally inserted between the bypass filter and the oil pan.

Of the two filtration systems discussed, the combination system (both full-flow and bypass filtration) provides the most engine protection, yet it is likely to be more costly than a full-flow system alone. Therefore, the Venturi Combo Lube Filter (VCLF) design was intended to provide the benefits of the combination filtration system while minimizing costs and complexity. The objective was to put the total filtration system in a single container and eliminate the additional plumbing associated with bypass filters.

Both full-flow filter media (FFM) and bypass type filter media (BPM) are preferably in a single container. A key feature of the Venturi Combo Lube Filter design is the increased utilization of the high capacity, high efficiency bypass type filter media. Specifically, the intent is to capture the bulk of the contaminant in the bypass type filter media while allowing the full-flow filter media to remain relatively clean. Thus, the full-flow filter media can provide continuous low-pressure-drop filtration.

The operation of the Venturi Combo Lube Filter is as follows; similar to the combination lube filter, the full-flow filter media and bypass type filter media share a common inlet. However, the Venturi Combo Lube Filter employs a venturi nozzle (see, for example, U.S. Pat. No. 5,695,637 to Jiang et al.) to direct and force/pull oil through the bypass type filter media at a high flow rate. The higher flow rate is accomplished via these flow mechanisms; the flow through the freer-flowing full-flow element is restricted by the nozzle throat at nozzle inlet, forcing more flow through the bypass type media. A low pressure zone in the throat of the nozzle generates a suction at the outlet of the bypass media, pulling more flow through the tight bypass section.

The bypass type filter media and full-flow filter media flows then merge inside the filter, thereby sending 100% of the filtered flow to the engine's lubrication system. The system is made energy efficient by the use of a nozzle diffuser which reduces the fluid's velocity to recover a portion of the pressure drop lost in the nozzle throat (ref. Bernoulli's equation).

Note the Venturi Combo Lube Filter preferably has only one outlet versus two in the combination lube filter. The single outlet simplifies engine plumbing. Also, elimination of the companion engine bypass flow circuit eliminates parasitic bypass flow. Having one filter inlet and outlet means existing applications which use full-flow-only filter can easily apply the Venturi Combo Lube Filter with no equipment/engine modifications.

SUMMARY

Related objects and advantages of the present invention will be apparent from the following description.

In a first embodiment of the present application there is a filter cartridge for filtering fluid. The filter cartridge comprises an annular full flow filter media extending axially between a first end and a second end and having an interior cavity defined therebetween. The filter cartridge further comprises a reinforcing member positioned within the interior cavity and extending axially at least substantially between the first end and the second end, in which the reinforcing member includes a plurality of axially spaced apart connecting segments. The filter cartridge further comprises a bypass tube positioned within the interior cavity radially inward from the reinforcing member. The filter cartridge further comprises a plurality of substantially axially extending ribs that connects the reinforcing member to the bypass tube, in which the ribs and the connecting segments define a plurality of flow apertures in the reinforcing member. The filter cartridge further comprises a bypass filter media which includes a plurality of stacked disks extending between a top end and a bottom end in which each disk includes an aperture. The apertures in the adjacent disks overlap one another to define a channel extending between the bottom end and the top end. The bottom end of the channel is positioned adjacent the bypass tube to define a flow path therebetween.

In one refinement of an embodiment of the invention the filter cartridge comprises a first endplate and a second endplate. A reinforcing member is coupled between the first endplate and the second endplate. A bottom end of the bypass filter media engages the second endplate. The second endplate defines a flow opening fluidly connected to the channel.

In another refinement of an embodiment of the invention the filter cartridge comprises a bottom end of the bypass tube which extends into a venturi section which is connected to the plurality of substantially axially extending ribs. The ribs maintain each of the venturi section and the bypass tube in a centered concentric relation relative to the reinforcing member.

In another refinement of an embodiment of the invention the filter cartridge includes a reinforcing member, a plurality of substantially axially extending ribs, a bypass tube, and a venturi section that are integrally formed from plastic.

In another embodiment of the present invention there is a combination full flow and bypass flow filter cartridge. The combination full flow and bypass flow filter cartridge comprises a bypass media which defines an internal flow channel that is fluidly connected to an axially extending bypass tube positioned within a centertube. The centertube comprises a plurality of axially offset circumferential segments extending between a plurality of axially extending ribs. The axial ribs extend from a bypass end to an outlet end and connect at least one of the circumferential segments to the bypass tube and at least one of the circumferential segments to a venturi nozzle. The bypass tube extends into the venturi nozzle and the centertube is positioned within a full flow media.

In one refinement of an embodiment of the invention the filter cartridge includes ribs and connecting segments of the centertube that are integrally formed from a plastic.

In another refinement of an embodiment of the invention the filter cartridge further comprises the centertube that is integrally formed from plastic with the venturi nozzle and the bypass tube.

In another refinement of an embodiment of the invention the filter cartridge further comprises the plurality of connecting segments of the filter cartridge form a plurality of axially spaced apart rings. The respective pairs of the axially spaced apart rings and the plurality of axially extending ribs cooperate to define a plurality of flow apertures therebetween.

In another refinement of an embodiment of the invention the filter cartridge includes ribs which maintain each of the venturi nozzle and the bypass tube in a centered concentric relation relative to the centertube.

In another embodiment of the present application is a filter apparatus for filtering fluid in an internal combustion engine. The filter apparatus comprises an annular full flow filter media extending axially between a first end and a second end. The full flow filter media surrounds a reinforcing member which extends axially between the first end and the second end. The reinforcing member includes a plurality of axially spaced apart circumferential connecting segments. The segments extend between a plurality of substantially axially extending ribs in which the ribs connect the reinforcing member to a radially inwardly spaced bypass tube. The reinforcing member includes a plurality of flow apertures defined by the connecting segments and the ribs.

In one refinement of an embodiment of the invention the filter apparatus comprises a reinforcing member, a bypass tube, and ribs that are integrally formed from plastic.

In another refinement of an embodiment of the invention the filter apparatus includes a plurality of connecting segments, at least some of which form a plurality of axially spaced apart rings.

In another refinement of an embodiment of the invention the filter apparatus includes a bypass tube, which includes an attachment portion extending axially at a first length beyond the first end and an attachment portion operable to engage a filter head.

In another refinement of an embodiment of the invention the filter apparatus contains an attachment portion which includes a plurality of slots extending axially from an outermost end of the attachment portion toward the first end of the reinforcing member at a second length, wherein the second length is less than the first length.

In another refinement of an embodiment of the invention the filter apparatus contains flow apertures that are sized to prevent fluid being filtered from blowing the full flow filter media therethrough.

In another refinement of an embodiment of the invention the filter apparatus further comprises a plurality of axially extending vertical support members coupled to the connecting segments.

In another refinement of an embodiment of the invention the filter apparatus comprises a venturi nozzle positioned within the reinforcing member and connected thereto by the plurality of substantially axially extending ribs.

In another embodiment of the present invention, there is a combination full flow and bypass filter apparatus. The filter apparatus comprises a centertube extending axially between a first end and a second end. The centertube includes a plurality of flow apertures. The filter apparatus further comprises an annular full flow filter media surrounding the centertube, a bypass tube positioned within the centertube, and a plurality of ribs connecting the centertube to the bypass tube. The ribs extend axially along at least a substantial portion of the centertube. The filter apparatus further comprises a bypass filter media. The bypass filter media includes a plurality of stacked disks extending between a top end and a bottom end, wherein each disk includes an aperture. The apertures in the adjacent disks overlap one another to define a channel extending between the bottom end and the top end, in which the bottom end of the channel is fluidly connected to the bypass tube.

In one refinement of the embodiment of the invention the filter apparatus comprises a centertube which includes a plurality of axially spaced apart circumferential connecting segments. The plurality of flow apertures of the filter apparatus are defined by the connecting segments and the ribs.

In another refinement of an embodiment of the invention the filter apparatus comprises the plurality of connecting segments to form a plurality of axially spaced apart rings.

In another refinement of an embodiment of the invention the filter apparatus includes the plurality of axially spaced apart rings that are evenly spaced axially relative to one another.

In another refinement of the embodiment of the invention the filter apparatus contains a plurality of connecting segments that are circumferentially offset from one another such that respective connecting segments cooperate to define a zig-zag relationship therebetween.

In another refinement of the embodiment of the invention the filter apparatus contains a bypass tube that includes an attachment portion extending axially at a first length beyond the first end. The attachment portion includes a plurality of slots extending axially from an outermost end of the attachment portion towards the first end at a second length less than the first length, wherein the attachment portion is operable to engage a filter head.

In the refinement of the embodiment of the invention the filter apparatus contains a bottom end of the bypass tube that extends into a venturi section that is connected to the plurality of substantially axially extending ribs, wherein the ribs maintain each of the venturi section and the bypass tube in a centered concentric relation relative to the reinforcing member.

DETAILED DESCRIPTION

Figure 1:
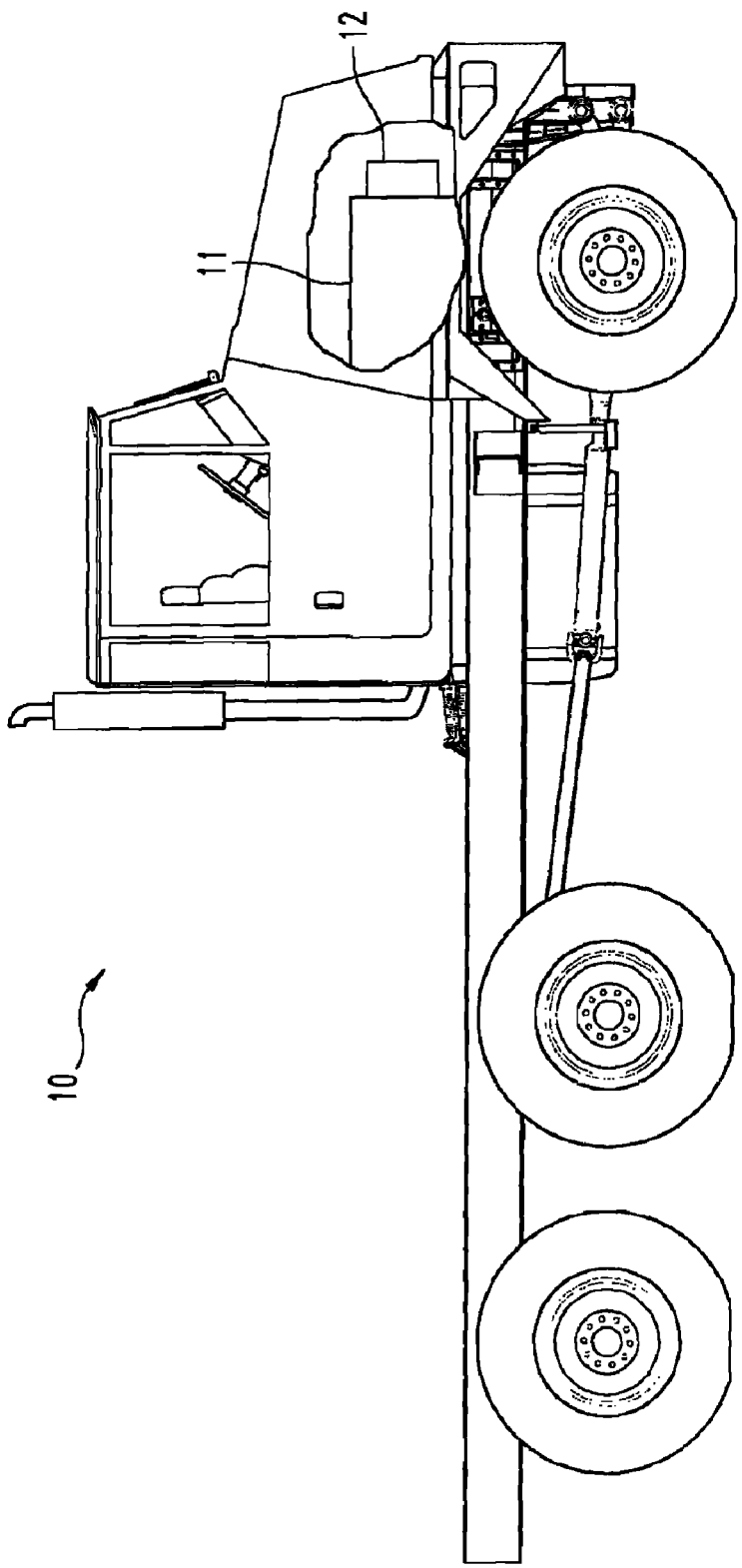
FIG. 1 is a side view of a vehicle including an engine and a filtration system.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1 there is illustrated a vehicle 10. Vehicle 10 could be a variety of types of vehicles, for example, a light duty truck, a medium duty truck, a heavy duty truck, a passenger vehicle, a bus, or an industrial or construction vehicle. Vehicle 10 includes an engine 11, which is preferably a diesel engine but could be other types of internal combustion engines, and a filtration system 12 which is in flow communication with engine 11 and is operable to filter fluids to be provided to engine 11. Filtration system 12 could be the same as or similar to filtration systems described herein or components thereof.

The present invention relates generally to a filter that can be used, for example, with internal combustion engines, such as diesel or gasoline powered engines. Such filter units are important since various fluids used in vehicle engines are susceptible to being contaminated by water, sand, dirt and other particulate materials. Impurities such as products of combustion, soot, moisture, dust, abrasion powder, etc. mix with the lubricating oil every moment during the operation of an automobile's engine and the impurities are filtered by the filter assembly. Thus, there are many applications for filters according to the present invention. For example, the filter assembly can be used for farm equipment, construction equipment, skidders, loaders, other off-road vehicles, heavy-duty highway trucks, automobiles, and other vehicles, industrial machines requiring hydraulic filtering, and all other equipment or mechanical devices that require the filtering of fluids. Additionally, the filter assembly can be used to remove foreign matter from a variety of different fluids. Examples of liquid fluids include hydraulic fluids, engine lubrication oil, diesel fuel, gasoline, engine coolant, automatic transmission fluid, and any other type of fluid. Filter assemblies can also be used with gaseous fluids such as air and exhaust.

Figure 2:
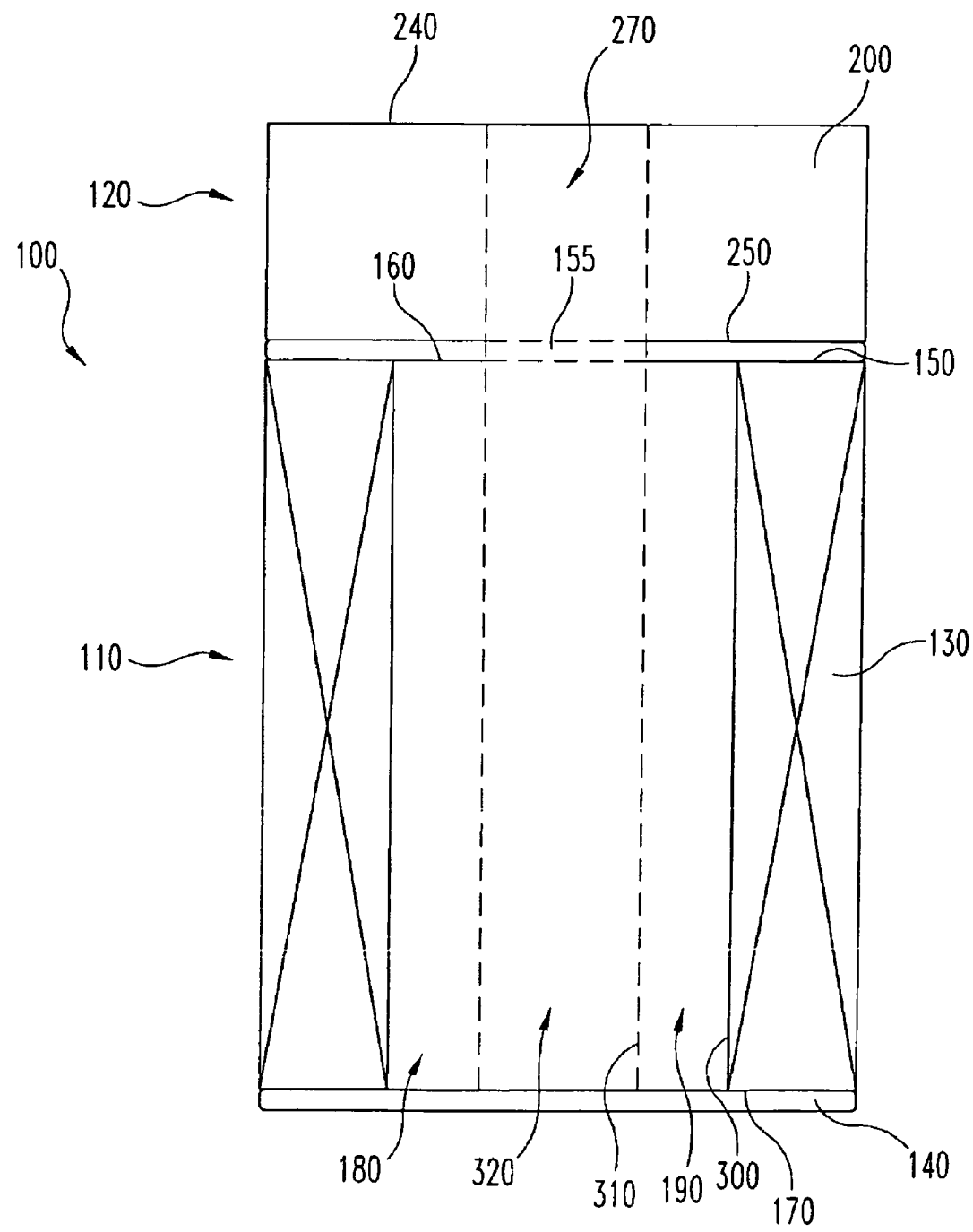
FIG. 2 is a schematic representation of a filter apparatus including a full flow filter portion and a bypass filter portion.

Various embodiments of the present invention relate to combination full flow media and bypass media filter cartridge. Combination filter cartridges find applications in, for example, filtering fluid in an internal combustion engine. As illustrated in FIG. 2, one embodiment of a filter cartridge 100 includes a full flow filter portion 110 and a bypass filter portion 120. Full flow filter portion 110 includes full flow filter media 130 extending between a open end endplate 140 and dome end endplate 150. While not shown in FIG. 2, it is contemplated that the filter cartridge 100 is preferably configured for insertion into a filter apparatus having a housing, such as, for example like the filter apparatus described in connection with FIG. 7.

Figure 3:
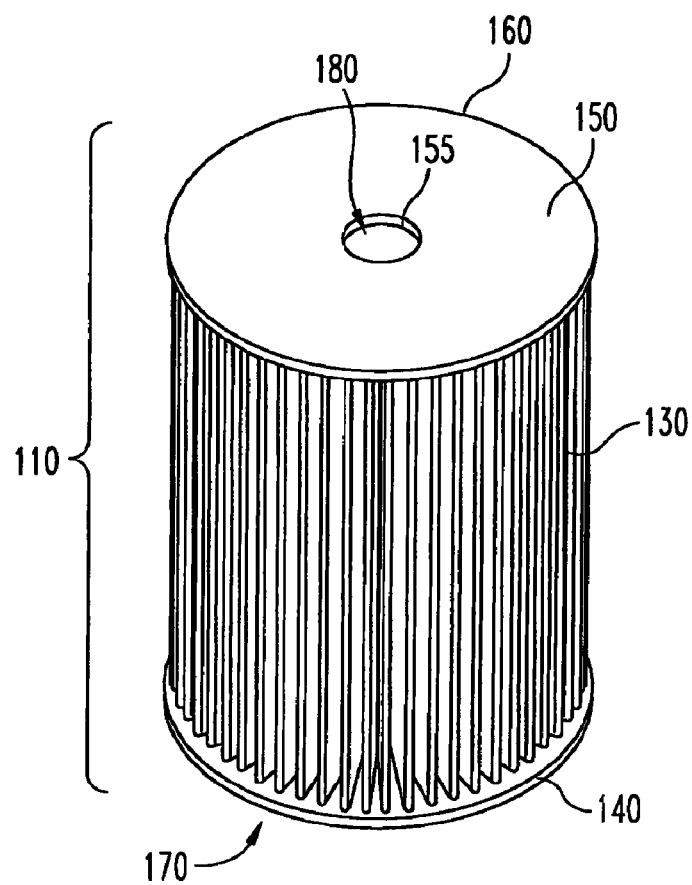
FIG. 3 is a perspective view of the full flow filter portion of FIG. 2.

As shown in FIGS. 2 and 3, the full flow filter media 130 is preferably embedded into the endplates 140, 150. It is contemplated as within the scope of the invention, however, that full flow filter media 130 may be attached to endplates 140, 150 by a variety of methods known to those skilled in the art including various adhesives, as opposed to being embedded. The full flow filter media 130 is preferably a substantially annular pleated cellulose media extending from a dome end 160 to a open end 170 between, and joined to, the endplates 140, 150. The full flow filter media 130 defines an at least partially open internal volume 180 when it is a substantially annular shape (see FIG. 3). Embedding of the various elements referred to herein is preferably accomplished by welding two or more elements together, but could also be accomplished by other techniques and processes that obviate the need for use of a potting material such as plastisol to couple various elements to one another, for example, by forming or molding one element around a portion of another, by flame embedding, by laser welding, and/or by heat welding.

Figure 4:
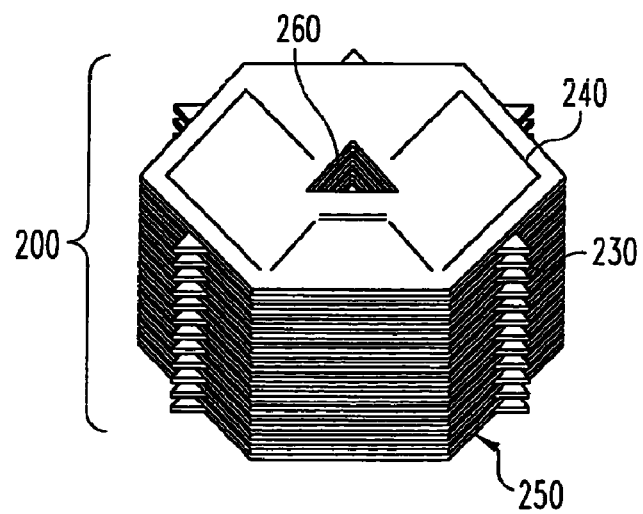
FIG. 4 is a perspective view of the bypass filter portion of FIG. 2.

Referring now to FIGS. 2 and 4, bypass filter portion 120 includes bypass filter media 200 that comprises a plurality of stacked disks 230 extending between a open end 250 and a dome end 240. Each disk in the plurality of stacked disks 230 includes an opening 260. Preferably, the openings 260 of each of the stacked disks 230 align to form a flow channel 270. As described in further detail below, the flow channel 270 of the plurality of stacked disks 230 is preferably aligned with an orifice 155 defined by the dome end endplate 150 of the full flow filter portion 110 (see FIGS. 2 and 3).

Again with reference to FIG. 2, the full flow filter portion 110 further includes a reinforcing member 300, in the form of a centertube, and a bypass conduit or tube 310. One form of the present invention contemplates that the reinforcing member 300 and the bypass tube 310 are preferably a unitary structure formed of a composite or plastic material such as thermoplastic. Other embodiments contemplate that the reinforcing member 300 and the bypass tube 310 could be formed of multiple pieces coupled together. The reinforcing member 300 is positioned within internal volume 180 and includes a plurality of flow apertures (not shown in FIG. 2) operable to permit flow of filtered fluid through the full flow filter media 130 and into an interior region 190 within the reinforcing member 300 and ultimately out of the filter cartridge 100. The reinforcing member 300 preferably extends axially from dome end 160 to open end 170 such that the reinforcing member 300 is surrounded by the full flow filter media 130.

The bypass tube 310 preferably has a substantially hollow interior 320 and is positioned within the reinforcing member 300 and connected thereto by a plurality of axially extending ribs (not shown). The bypass tube 310 is oriented within the reinforcing member 300 such that the bypass tube 310 extends to dome end 160 substantially adjacent the dome end endplate 150. When the filter cartridge 100 is assembled the open end 250 of the bypass filter media 200 it is preferably substantially adjacent the dome end endplate 150 of the full flow filter portion 110, such that, the bypass tube 310, the flow channel 270, and the orifice 155 align to form a bypass flow path. While it is shown in FIG. 2 that bypass tube 310 extends between open end endplate 140 and dome end endplate 150, it is contemplated, and described in further detail below, that bypass tube 310 may extend from the dome end 160 into a venturi section. Additionally, it is also contemplated that the bypass tube 310 extends axially beyond one or both endplates 140, 150 when the filter cartridge is assembled.

Figure 5:
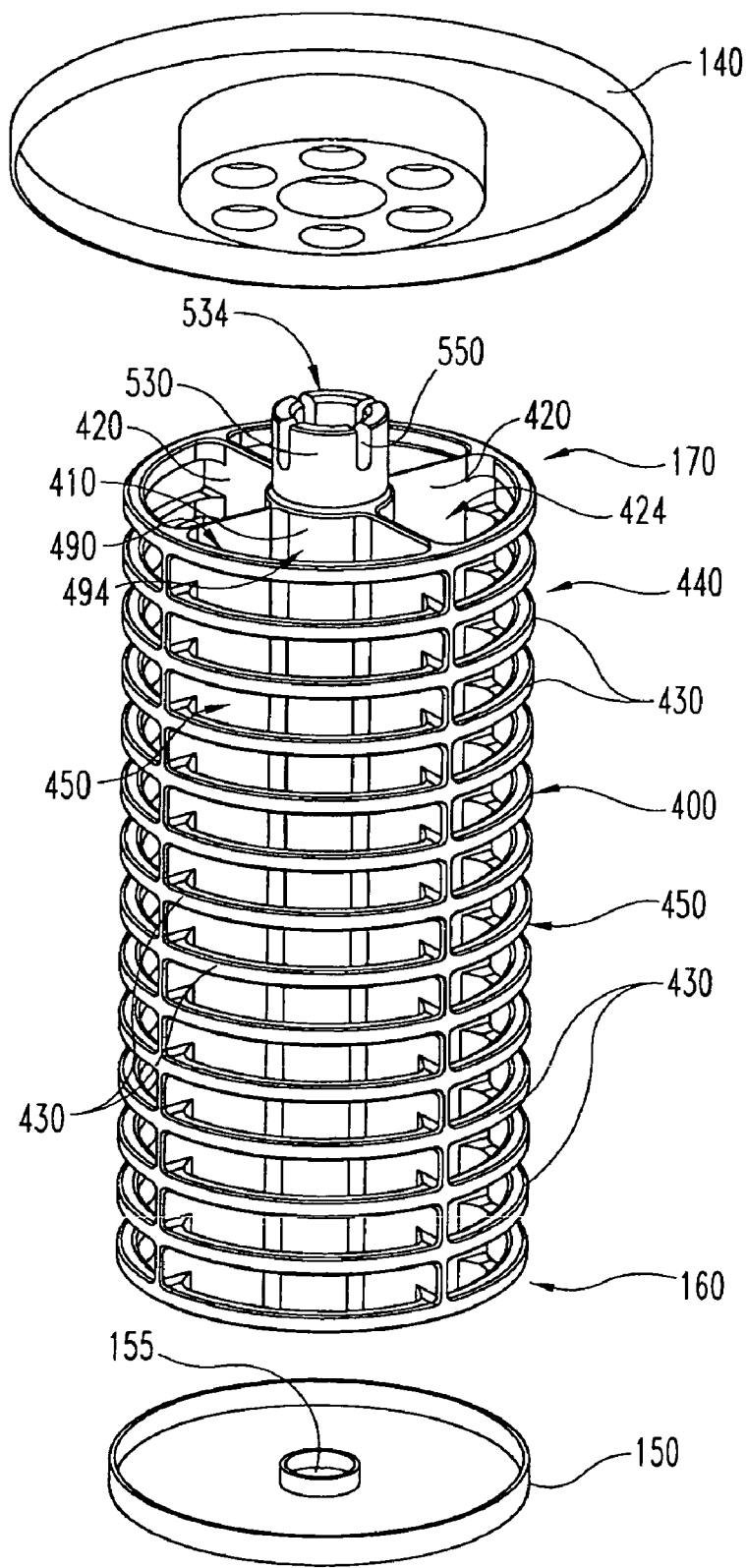
FIG. 5 is an exploded perspective view of a reinforcing member and a pair of endplates.
Figure 6:
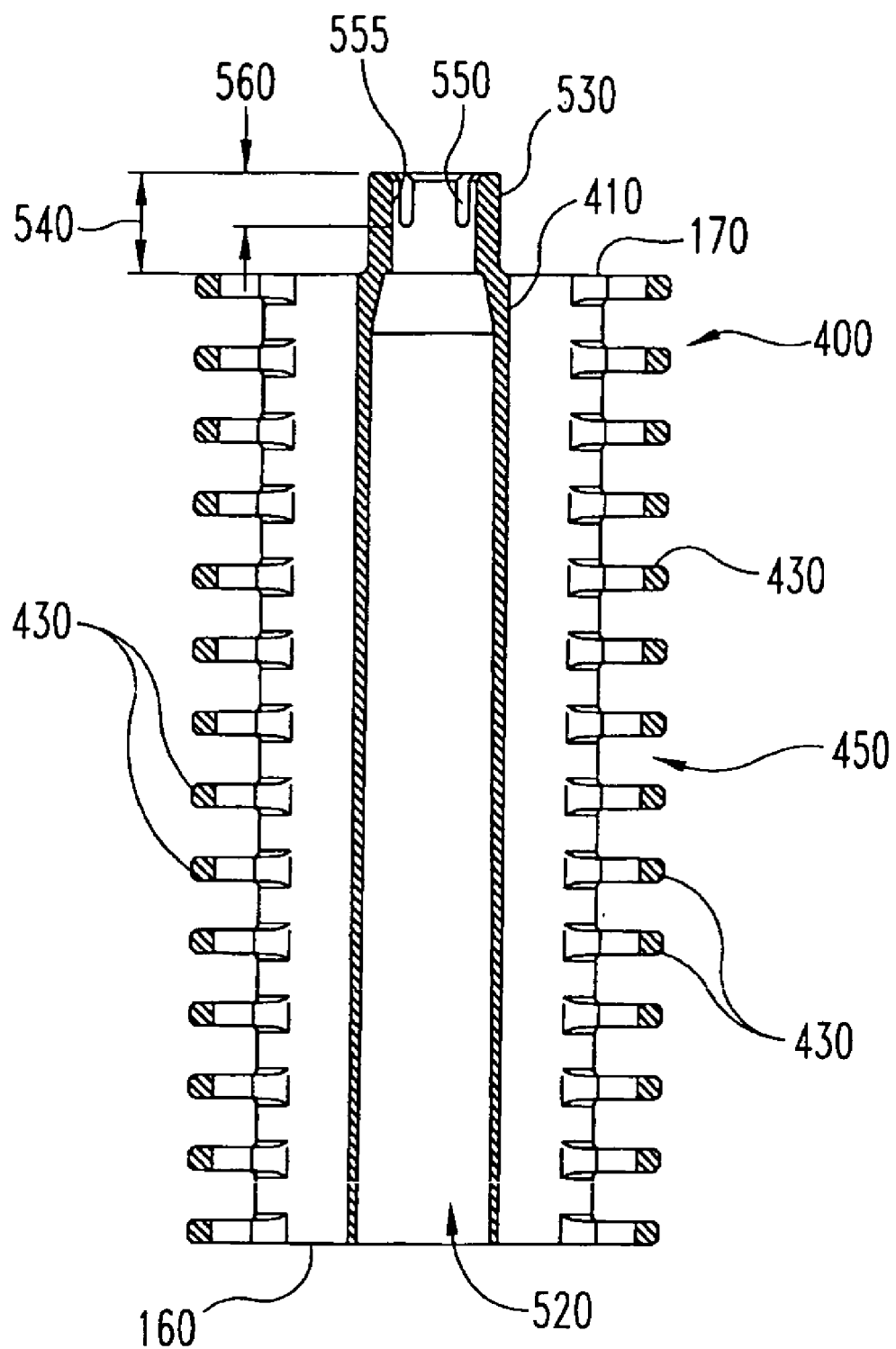
FIG. 6 is side cross-sectional view of the reinforcing member of FIG. 5.

Referring now to FIGS. 5 and 6, there is illustrated another embodiment of the present invention including a reinforcing member 400, in the form of a centertube and a bypass conduit or tube 410 where the reference numerals previously described represent like features. Preferably, the reinforcing member 400 and the bypass tube 410 are components in a filter cartridge, such as the one described above with reference to FIGS. 2-4. The reinforcing member 400 preferably extends axially from the dome end 160 to the open end 170 such that the reinforcing member 400 is surrounded by the full flow filter media (not shown in FIGS. 5 and 6). The reinforcing member 400 is connected to the bypass tube 410 by a plurality of preferably axially or substantially axially extending ribs 420. As shown in FIG. 5, one form of the present application contemplates four equally spaced apart vertical ribs 420 connecting the bypass tube 410 to the reinforcing member 400 and forming a plurality of full flow filtered fluid channels 424. Other forms contemplate a different number of ribs 420 and/or the ribs 420 not being equally spaced apart. The reinforcing member 400 includes a plurality of axially spaced apart connecting segments 430 circumferentially extending between a corresponding pair of ribs 420. Preferably, a plurality of layers or circumferential rings 440 are formed from four connecting segments 430 extending between respective pairs of the four ribs 420 such that the reinforcing member 400 is formed from a plurality of axially spaced apart rings 440.

A plurality of flow apertures 450 are defined between adjacent connecting segments 430 and ribs 420 and are operable to allow flow of filtered fluid through the full flow filter media and into the fluid channels 424, collectively an interior region 490 within the reinforcing member 400, and ultimately out of the filter cartridge through full flow outlets 494 and into a filter head (not shown). The flow apertures 450 are preferably sized to prevent or minimize the full flow filter media from being forced or blown through by the pressure of the fluid to be filtered. In other words, those of ordinary skill in the art will know that the spacing between the ribs and connecting segments (i.e., the size of the flow apertures) will be designed so that the filter media will not blow through the apertures 450. Such design will also preferably factor in the desire that the centertube retain the strength to meet any collapse strength specification. In one embodiment, the filter media might be a multi-layered synthetic media, such as STRATAPORE media manufactured by Cummins Filtration Inc. who is the assignee of the present application, backed with wire screen which strengthens the media and the axial spacing of the respective connecting segments 430 forming the flow apertures 450 might be about 0.25 inches (0.635 cm) or less.

As shown in FIGS. 5 and 6, the bypass tube 410 preferably has a substantially hollow interior 520 and is positioned and maintained in a preferably centered concentric relation relative to the reinforcing member 400 by the plurality of axially extending ribs 420. The bypass tube 410 is oriented within the reinforcing member 400 such that the bypass tube 410 extends between the dome end 160 substantially adjacent the dome end endplate 150 and includes an attachment portion 530 extending axially outward at a first length 540 from open end 170. As described previously with reference to FIG. 2, when the filter cartridge is assembled, the open end of bypass filter media is preferably substantially adjacent the dome end endplate 150, such that, the bypass tube 410, the flow channel defined within the bypass filter media, and the orifice 155 align to form a bypass flow path. The fluid passes through the bypass filter media then through the flow channel and ultimately through an outlet end 534 of the attachment portion 530 and into a filter open (not shown).

As shown in FIGS. 5 and 6, one form of the present invention contemplates that the attachment portion 530 is operable to engage a portion of a filter head (not shown) and create a liquid tight seal therewith preferably without the use of a rubber grommet. The attachment portion 530 includes a plurality of axially extending slots 550 extending from an outermost end 555 of the attachment portion 530 toward the dome end 160. The slots 550 preferably extend at a second length 560 which is less than the first length 540. The slots 550 allow the attachment portion 530 to flex or change in size to receive a portion of the filter head or be received within a portion of the filter head, creating a liquid tight seal with the filter head (not shown).

With reference to FIGS. 5 and 6, one form of the present invention contemplates that the reinforcing member 400, the bypass tube 410, ribs 420, and attachment portion 530 are preferably a unitary structure formed of a composite or plastic material such as thermoplastic. Other embodiments contemplate that the reinforcing member 400, the bypass tube 410, ribs 420, and attachment portion 530 could be formed of multiple pieces coupled together.

Figure 7:
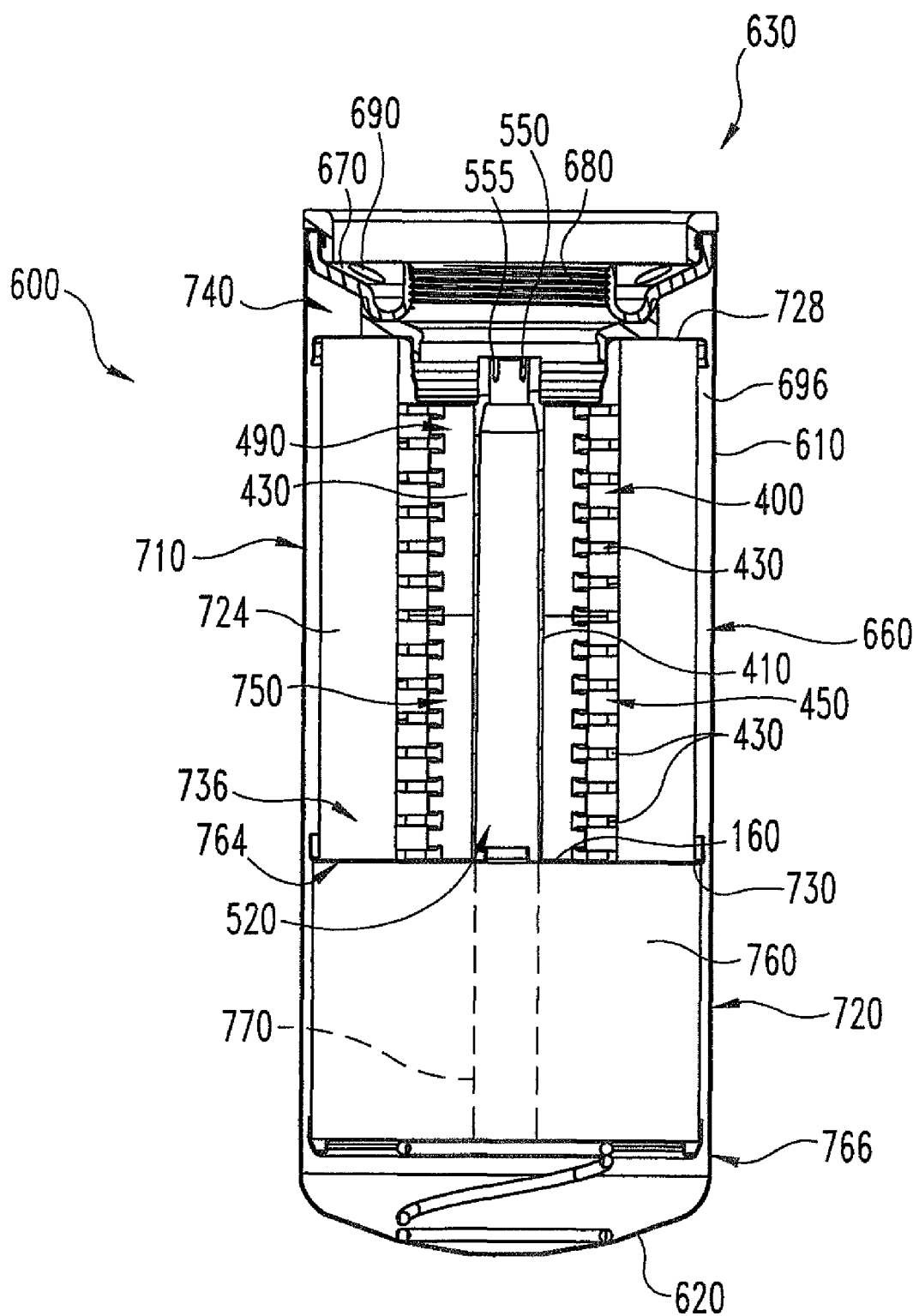
FIG. 7 is a partial perspective cross-sectional view of a filter apparatus.

Referring now to FIG. 7, there is illustrated a filter apparatus 600 where the reference numerals previously described represent like features. The filter apparatus 600 includes a housing 610 extending between a dome section 620 and a open section 630 and defining an interior space 640 therebetween. A filter cartridge 660 is positioned within the interior space 640. The open section 630 includes a nutplate 670 having a threaded section 680 defining a fluid outlet and being operable to couple the filter apparatus 600 to a filter head (not shown) and a plurality of fluid inlets 690 operable to deliver fluid to be filtered into a gap 696 between the housing 610 and the filter cartridge 660.

The filter cartridge 660 is preferably a combination full flow media and bypass media filter cartridge. As illustrated in FIG. 7, the filter cartridge 660 includes a full flow filter portion 710 and a bypass filter portion 720. The full flow filter portion 710 includes full flow filter media 724 extending between a open end endplate 728 and dome end endplate 730. The full flow filter media 724 is preferably a substantially annular pleated cellulose media extending from a dome end 736 to a open end 740 between, and joined to, the endplates 1040, 1050. The full flow filter media 724 defines an at least partially open internal volume 750.

The bypass filter portion 720 includes a bypass filter media 760 similar to bypass filter media 200 described above with reference to FIGS. 2 and 4. The bypass filter media 760 preferably includes a plurality of stacked disks (not shown) extending between a top end 764 and a bottom end 766. Each disk in the plurality of stacked disks includes an opening preferably aligned to form a flow channel 770. The flow channel 770 of the plurality of stacked disks is preferably aligned with an orifice (not shown) defined by dome end endplate 730 of the full flow filter portion 710.

Again with reference to FIG. 7, the full flow filter portion 710 further includes the reinforcing member 400. The reinforcing member 400 preferably extends axially from the dome end 736 to the open end 740 such that the reinforcing member 400 is substantially surrounded by the full flow filter media. As discussed above with reference to FIG. 5, the reinforcing member 400 is connected to the bypass tube 410 by four equally spaced axially extending ribs 420 which form the plurality of full flow filtered fluid channels 424 therebetween. The plurality of flow apertures 450 are defined between respective pairs of axially spaced connecting segments 430 and ribs 420 and are operable to allow flow of fluid from the gap 696 through the full flow filter media 724 and into the interior region 490 within the reinforcing member 400. The bypass tube 410 is positioned and maintained in a preferably centered concentric relation relative to the reinforcing member 400 by the plurality of axially extending ribs 420. The bypass tube 410 is oriented within the reinforcing member 400 such that the bypass tube 410 extends between the dome end 736 substantially adjacent the dome end endplate 730. As described previously with reference to FIG. 2, when the filter cartridge is assembled the top end of bypass filter media 760 is preferably substantially adjacent the dome end endplate 730, such that, the bypass tube 410 and the flow channel 770 align to form a bypass outlet flow path.

Figure 8:
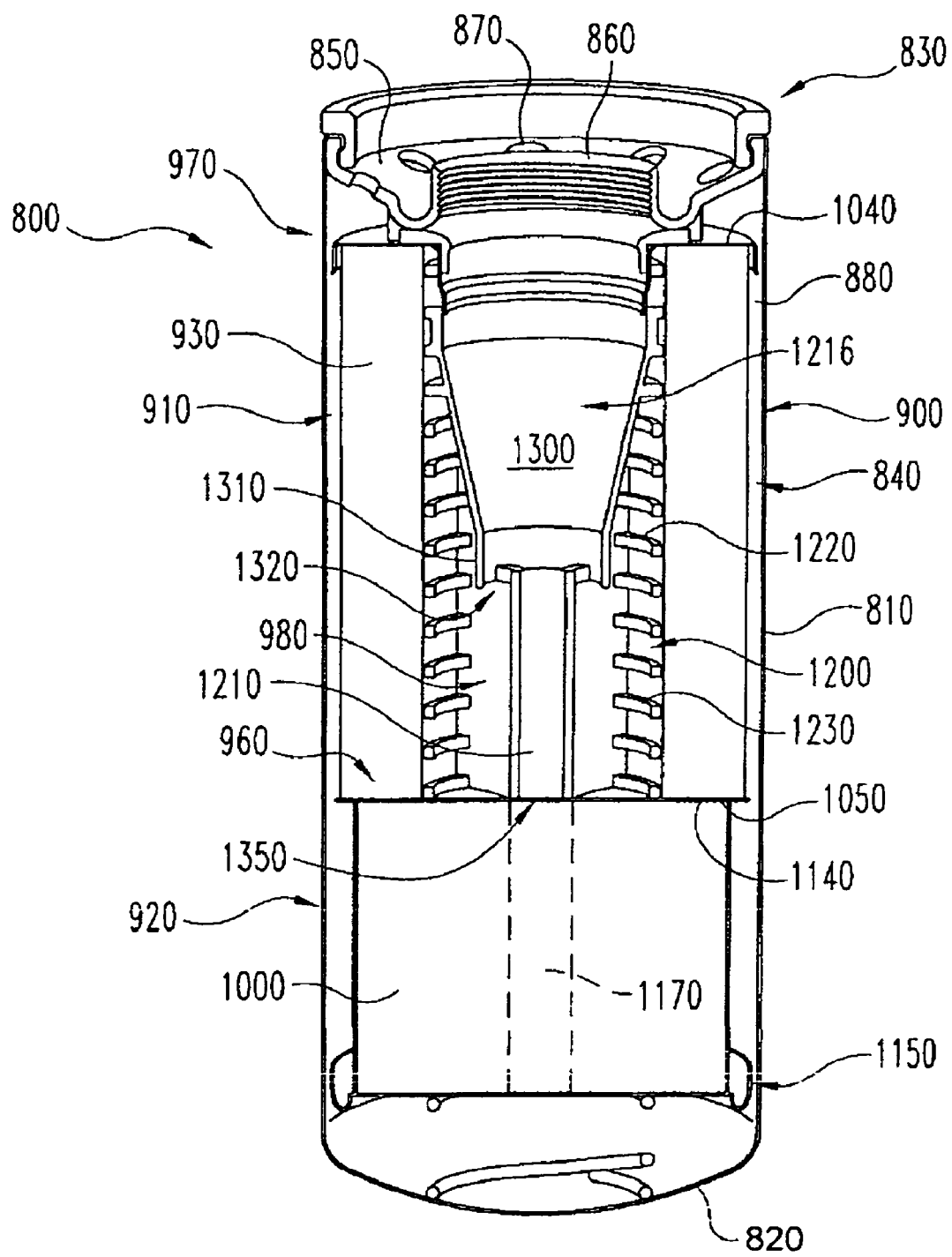
FIG. 8 is a partial perspective cross-sectional view of another embodiment of a filter apparatus.

Referring now to FIG. 8, there is illustrated a filter apparatus 800 including a housing 810 extending between a dome section 820 and a open section 830 and defining an interior space 840 therebetween. A filter cartridge 900 is positioned within the interior space 840. The open section 830 includes a nutplate 850 having a threaded section 860 defining a fluid outlet and being operable to couple the filter apparatus 800 to a filter open (not shown) and a plurality of fluid inlets 870 operable to deliver fluid to be filtered into a gap 880 between the housing 810 and the filter cartridge 900.

The filter cartridge 900 is preferably a combination full flow media and bypass media venturi filter cartridge. As illustrated in FIG. 8, the filter cartridge 900 includes a full flow filter portion 910 and a bypass filter portion 920. The full flow filter portion 910 includes full flow filter media 930 extending between a open end endplate 1040 and dome end endplate 1050. The full flow filter media 930 is preferably a substantially annular pleated cellulose media extending from a dome end 960 to a open end 970 between, and joined to, the endplates 1040, 1050. The full flow filter media 930 defines an at least partially open internal volume 980.

The bypass filter portion 920 includes a bypass filter media 1000 similar to bypass filter media 200 described above with reference to FIGS. 2 and 4. The bypass filter media 1000 preferably includes a plurality of stacked disks (not shown) extending between a top end 1150 and a bottom end 1140. Each disk in the plurality of stacked disks includes an opening preferably aligned to form a flow channel 1170. The flow channel 1170 of the plurality of stacked disks is preferably aligned with an orifice (not shown) defined by dome end endplate 1050 of full flow filter portion 910.

Again with reference to FIG. 8, the full flow filter portion 910 further includes a reinforcing member 1200, in the form of a centertube, a bypass conduit or tube 1210, and a venturi section 1216. One form of the present invention contemplates that the reinforcing member 1200, the bypass tube 1210, and the venturi section 1216 are preferably a unitary structure formed of a composite or plastic material such as thermoplastic. Other embodiments contemplate that the reinforcing member 1200, the bypass tube 1210, and the venturi section 1216 could be formed of multiple pieces coupled together.

Figure 9:
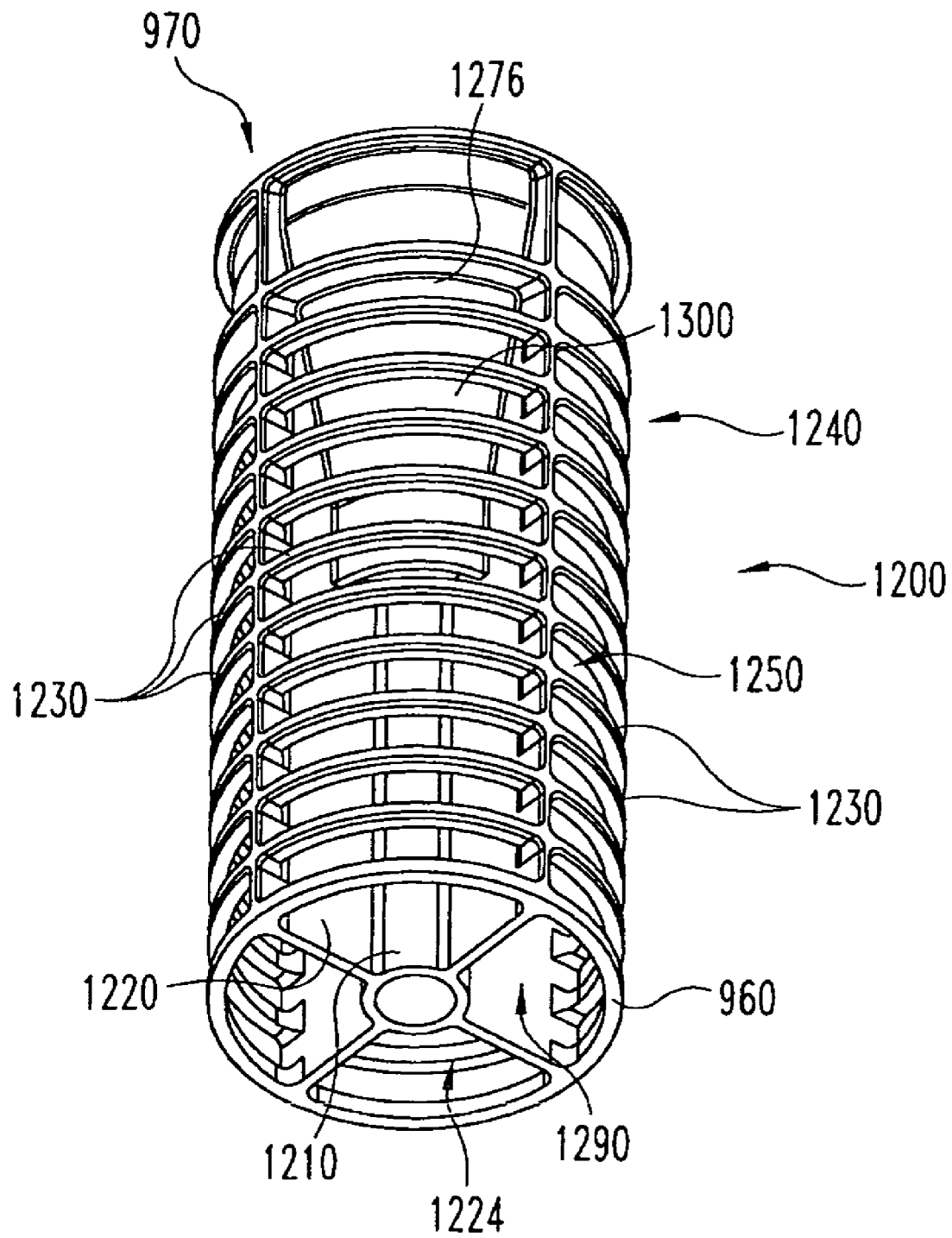
FIG. 9 is a perspective view of a reinforcing member of the filter apparatus of FIG. 8.

Referring now to FIGS. 8 and 9, the reinforcing member 1200 preferably extends axially from dome end 960 to open end 970 such that the reinforcing member 1200 is at least substantially surrounded by the full flow filter media (FIG. 8). The reinforcing member 1200 is connected to the bypass tube 1210 and the venturi section 1216 by a plurality of preferably axially extending ribs 1220. As shown in FIG. 9, four equally spaced axially extending ribs 1220 preferably connect the bypass tube 1210 and the venturi section 1216 to the reinforcing member 1200 and form a plurality of full flow filtered fluid channels 1224 (FIG. 9) therebetween. The reinforcing member includes a plurality of axially spaced connecting segments 1230 circumferentially extending between a corresponding pair of ribs 1220. Preferably, a plurality of layers or rings 1240 are formed from four connecting segments 1230 extending between respective pairs of the four ribs 1220 such that the reinforcing member 1200 is formed from a plurality of axially spaced rings 1240. A plurality of flow apertures 1250 are defined between respective pairs of axially spaced connecting segments 1230 and ribs 1220 and are operable to allow flow of fluid from the gap 880 through the full flow filter media 930 and into an interior region 1290 within the reinforcing member 1200. The flow apertures 1250 are preferably sized to prevent or minimize the full flow filter media 930 from being forced or blown through by the pressure of the fluid to be filtered.

As shown in FIG. 9, the bypass tube 1210 and venturi section 1216 each preferably has a substantially hollow interior and are positioned and maintained in a preferably centered concentric relation relative to the reinforcing member 1200 by the plurality of axially extending ribs 1220. The bypass tube 1210 is oriented within the reinforcing member 1200 such that the bypass tube 1210 extends between the dome end 960 substantially adjacent the dome end endplate 1050 (FIG. 8) and the venturi section 1216. As described previously with reference to FIG. 2, when the filter cartridge is assembled the open end of bypass filter media is preferably substantially adjacent the dome end endplate 1050, such that, the bypass tube 1210, the venturi section 1216, and the flow channel 1170 align to form a bypass outlet flow path. The fluid channels 1224 align with the venturi section 1216 to form a full flow outlet flow path. Preferably, the full flow outlet flow path and the bypass flow path both flow through the venturi section 1216 and into a filter open. The venturi section 1216 includes a venturi nozzle 1300 to direct and force/pull fluid through the bypass filter media 1000 at a high flow rate. The higher flow rate of the fluid is accomplished by the flow through the freer-flowing full flow filter media 930 being restricted by a nozzle throat 1310 at an inlet 1320 for nozzle 1300, forcing more flow through the bypass filter media 1000. A low pressure zone in the throat 1310 of the nozzle generates a suction at an outlet 1350 of the bypass filter media 1000, pulling more flow through the tight bypass portion 920. Other examples of nozzle shapes, designs and venturi sections in general may be found in U.S. Pat. No. 5,965,637 to Jiang et al., the contents of which are incorporated herein by reference.

Figure 10:
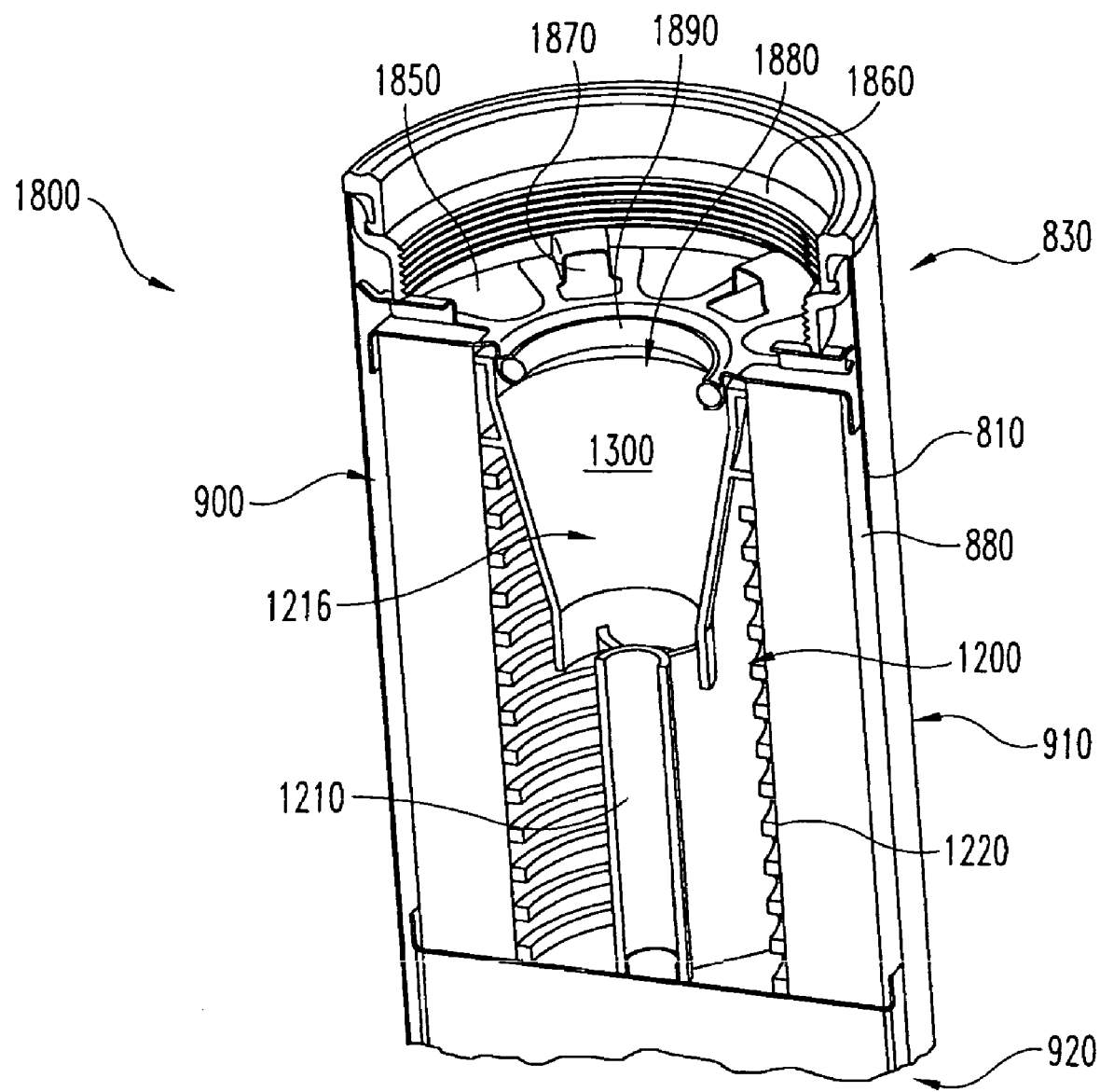
FIG. 10 is a partial perspective cross-sectional view of another embodiment of a filter apparatus.

Referring now to FIG. 10, there is illustrated a filter apparatus 1800 where the reference numerals previously described represent like features. A open section 1830 includes a nutplate 1850 having a threaded section 1860 being operable to couple the filter apparatus 1800 to a filter head (not shown) a plurality of fluid inlets 1870 operable to deliver fluid to be filtered into the gap 880 between the housing 810 and the filter cartridge 900 and a fluid outlet 1880. The filter apparatus 1800 is similar to the filter apparatus 800 of FIG. 8, except the fluid inlets 1870 and fluid outlet 1880 are both radially inward of the threaded section 1860. Additionally, a rubber grommet 1890 is positioned on an outer surface 1900 of the venturi section 1216 to prevent fluid leakage and/or unfiltered fluid contamination when the filter apparatus 1800 is coupled to the filter head.

Figure 11:
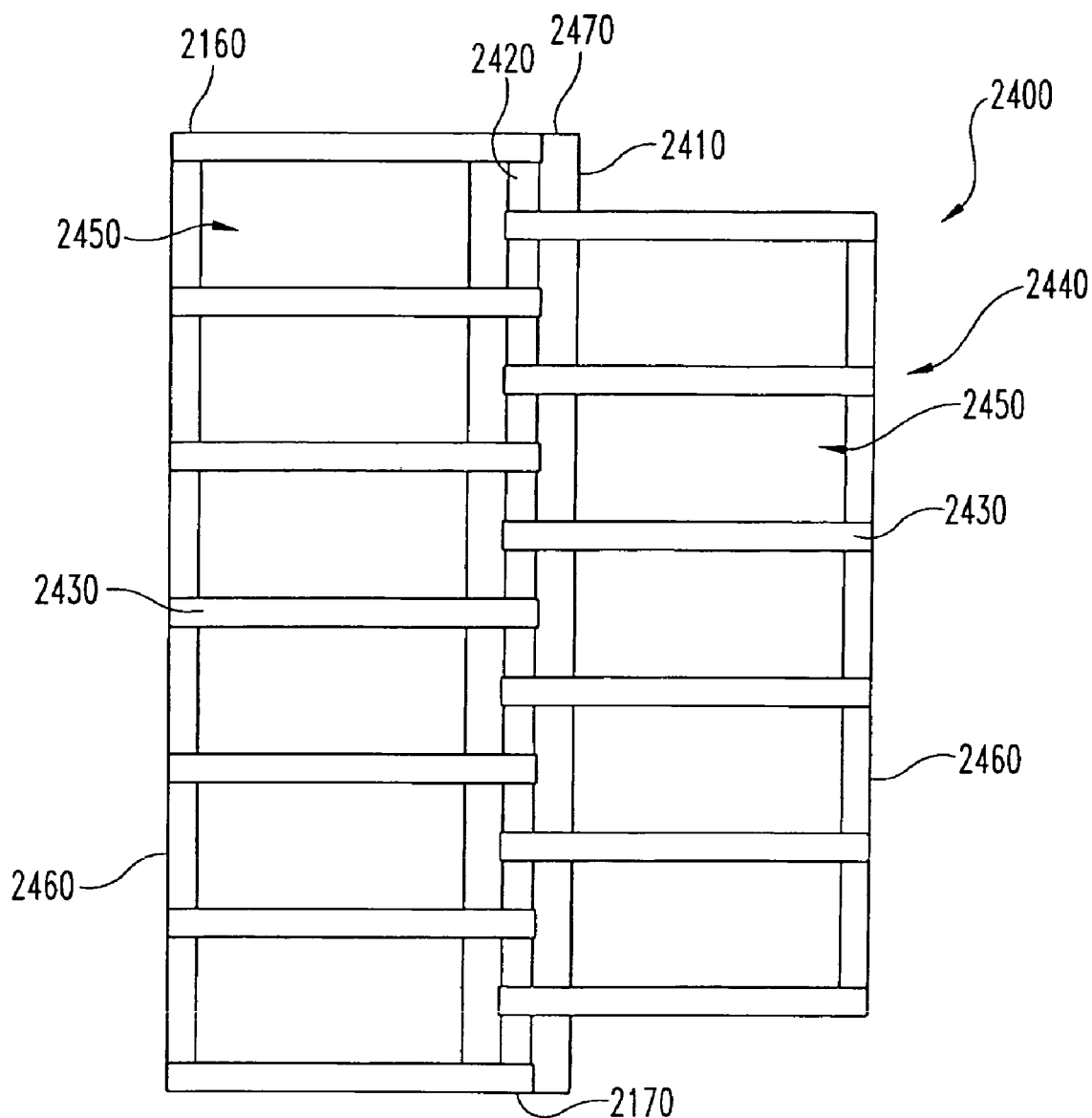
FIG. 11 is a side view of a schematic representation of a portion of another embodiment of a reinforcing member.
Figure 12:
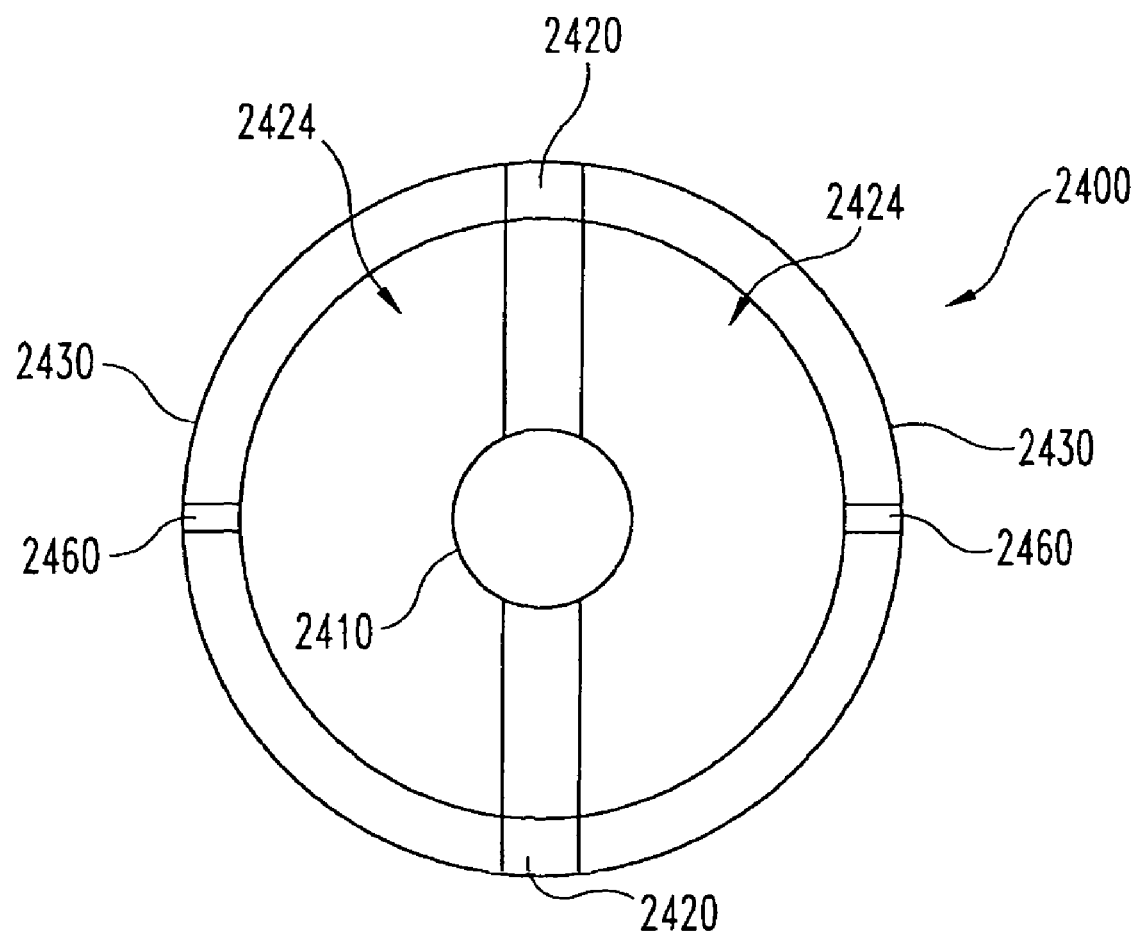
FIG. 12 is a cross-sectional view of a schematic representation of the portion of the reinforcing member of FIG. 11.

Referring now to FIGS. 11 and 12, there is illustrated another embodiment of the present invention including a reinforcing member 2400, in the form of a centertube, and a bypass conduit or tube 2410. Preferably, the reinforcing member 2400 and the bypass tube 2410 are components in a filter cartridge, such as the one described above with reference to FIGS. 2-4 and the bypass tube 2410 is preferably similar in form and/or operates in a similar manner to the bypass tube 410 discussed above. The reinforcing member 2400 preferably extends axially from a dome end 2160 to a open end 2170 such that the reinforcing member 2400 is surrounded by the full flow filter media (not shown in FIGS. 11 and 12). The reinforcing member 2400 is preferably connected to the bypass tube 2410 by at least a plurality of preferably substantially axially extending ribs 2420. As shown in FIG. 12, one form of the present application contemplates two equally spaced apart axially extending ribs 2420 preferably connecting the reinforcing member 2400 to the bypass tube 2410 and forming a plurality of full flow filtered fluid channels 2424. Other forms contemplate a different number of ribs 2420 and/or the ribs 2420 not being equally spaced apart. The reinforcing member 2400 includes a plurality of axially spaced apart connecting segments 2430 circumferentially extending between each of the pair of ribs 2420. Preferably, a plurality of half layers or half rings 2440 are formed from the connecting segments 2430 extending between the two ribs 2420. As shown in FIG. 11, the half rings 2440 are preferably axially spaced apart and circumferentially offset such that the reinforcing member 2400 is formed from the plurality of axially spaced apart, offset, half rings 2440.

As further shown in FIGS. 11 and 12, the reinforcing member 2400 preferably includes a plurality of preferably substantially axially extending vertical support members 2460 coupled to connecting segments 2430. A plurality of flow apertures 2450 are defined between respective pairs of axially spaced connecting segments 2430 and between ribs 2420 and the vertical support members 2460. The flow apertures 2450 are operable to allow flow of filtered fluid through the full flow filter media and into the fluid channels 2424 and ultimately out of the filter cartridge through full flow outlets (not shown) and into a filter head (not shown). The flow apertures 2450 are preferably sized to prevent or minimize the full flow filter media from being forced or blown therethrough by the pressure of the fluid to be filtered. It is further contemplated that the vertical support members 2460 could be removed, replaced or supplemented with additional axially extending ribs 2420. It is further contemplated that half rings 2440 could circumferentially extend a distance greater than or less than half way around the reinforcing member 2400. Additionally, it is further contemplated that half rings 2440 could be replaced with axially spaced apart and circumferentially offset quarter rings forming a zig-zag relationship therebetween such that the reinforcing member 2400 is formed from the plurality of axially spaced apart, offset, quarter rings.

As described previously with reference to FIG. 2, when the filter cartridge is assembled, the open end of bypass filter media is preferably substantially adjacent a dome end endplate (not shown), such that, the bypass tube 2410, the flow channel defined within the bypass filter media, and an orifice (not shown) in the dome end endplate align to form a bypass flow path. The fluid passes through the bypass filter media and then through the flow channel and ultimately through an outlet end 2470 of the bypass tube 2410 and into a filter head.

With reference to FIGS. 11 and 12, one form of the present invention contemplates that the reinforcing member 2400, the bypass tube 2410, ribs 2420, and vertical support members 2460 are preferably a unitary structure formed of a composite or plastic material such as thermoplastic. Other embodiments contemplate that the reinforcing member 2400, the bypass tube 2410, ribs 2420, and vertical support members 2460 could be formed of multiple pieces coupled together.

Figure 13:
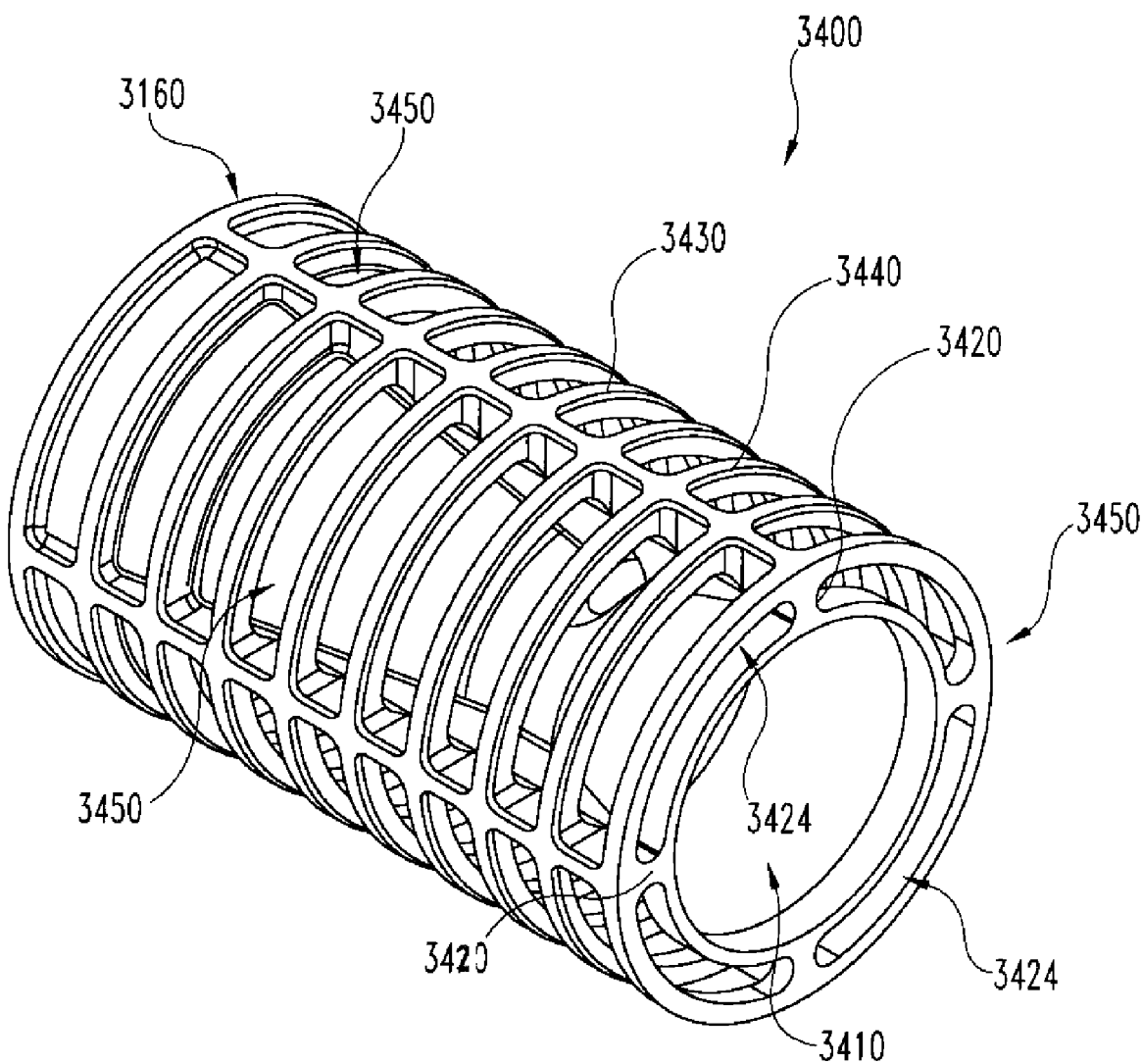
FIG. 13 is a perspective view of another embodiment of a reinforcing member.
Figure 14:
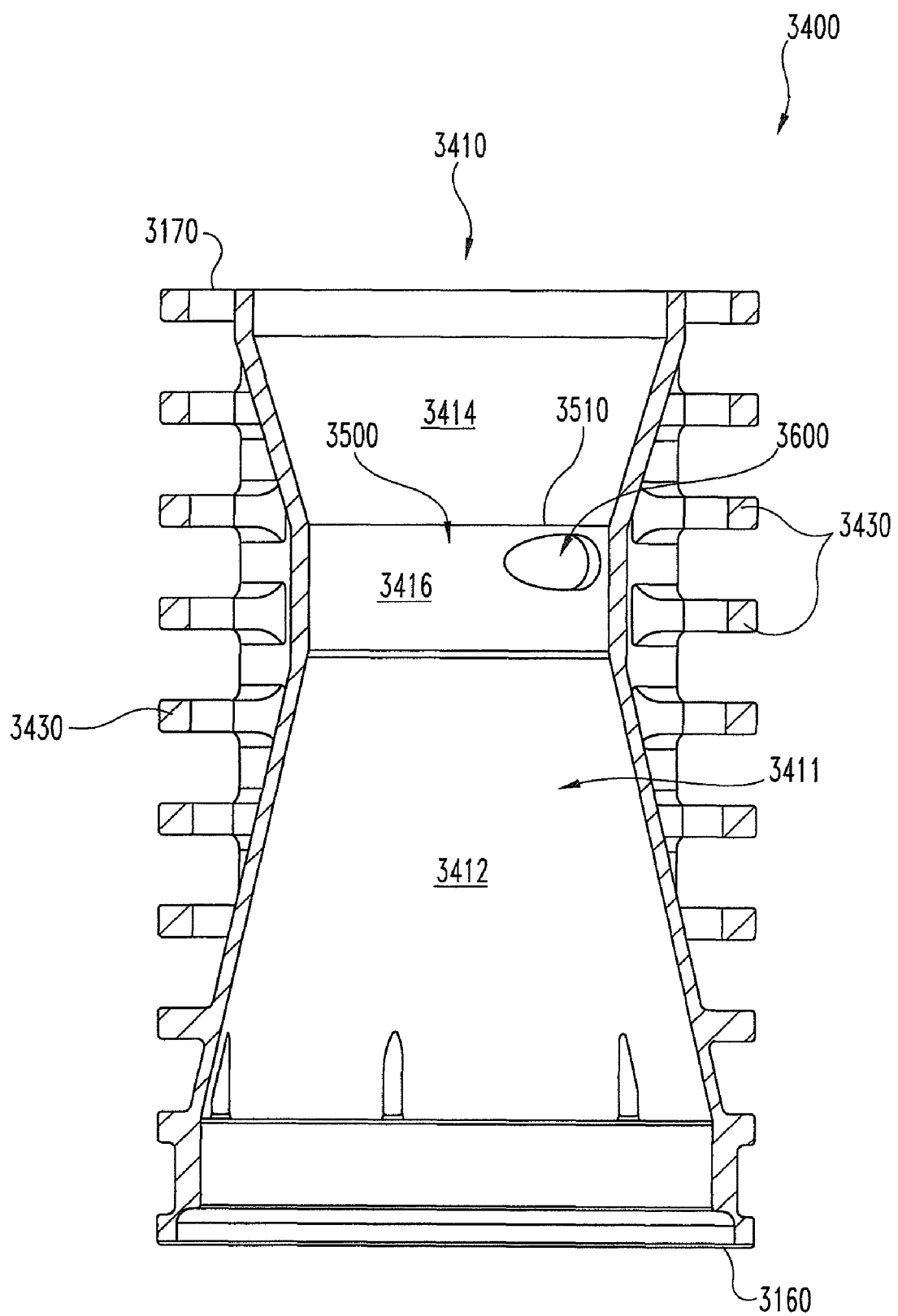
FIG. 14 is a side cross-sectional view of the reinforcing member of FIG. 13.

Referring now to FIGS. 13 and 14, there is illustrated another embodiment of the present invention including a reinforcing member 3400, in the form of a centertube, and a bypass channel 3410. Preferably, the reinforcing member 3400 and the bypass channel 3410 are components in a filter cartridge, such as the one described above with reference to FIGS. 2-4. As shown in FIG. 14, bypass channel 3410 is in the form of a venturi 3411 having a open end section 3412, a dome end section 3414, and a center section 3415. Referring now to both FIGS. 13 and 14, the reinforcing member 3400 preferably extends axially from a dome end 3160 to a open end 3170 such that the reinforcing member 3400 is surrounded by the full flow filter media (not shown in FIGS. 13 and 14). The reinforcing member 3400 is preferably connected to the bypass channel 3410 by at least a plurality of preferably substantially axially extending ribs 3420. As shown in FIG. 13, one form of the present application contemplates four equally spaced apart axially extending ribs 3420 preferably connecting the reinforcing member 3400 to the bypass channel 3410 and forming a plurality of full flow filtered fluid channels 3424. Other forms contemplate a different number of ribs 3420 and/or the ribs 3420 not being equally spaced apart. The reinforcing member 3400 includes a plurality of axially spaced apart connecting segments 3430 circumferentially extending between each pair of ribs 3420. Preferably, a plurality of rings 3440 are formed from the connecting segments 3430.

As further shown in FIGS. 13 and 14, a plurality of flow apertures 3450 are defined between respective pairs of axially spaced connecting segments 3430 and between ribs 3420. The flow apertures 3450 are operable to allow flow of filtered fluid through the full flow filter media and into the fluid channels 3424 and ultimately out of the filter cartridge through full flow outlets (not shown) and into a filter head (not shown). The flow apertures 3450 are preferably sized to prevent or minimize the full flow filter media from being forced or blown therethrough by the pressure of the fluid to be filtered.

As shown in FIG. 14, the open end section 3412, the dome end section 3414, and the center section 3415 each preferably has a substantially hollow interior and are positioned and maintained in a preferably centered concentric relation relative to the reinforcing member 3400 by the plurality of axially extending ribs 3420. As described previously with reference to FIG. 2, when the filter cartridge is assembled, the open end of bypass filter media is preferably substantially adjacent a closed end endplate (not shown), such that, the bypass channel 3410, the flow channel defined within the bypass filter media, and an orifice (not shown) in the closed end endplate align to form a bypass flow path. Preferably, the full flow outlet flow path and the bypass flow path both flow through the OPEN end section 3412, the dome end section 3414, and the center section 3415 of venturi 3411 and into a filter head. The venturi 3411 directs and forces/pulls fluid through the bypass filter media at a high flow rate. The higher flow rate of the fluid is accomplished by the flow through the freer-flowing full flow filter media being restricted by a nozzle throat 3500 at a dome end 3510 of the center section 3416, forcing more flow through the bypass filter media. A low pressure zone in the throat 3500 generates a suction at an outlet of the bypass filter media. The center section 3416 further includes at least one aperture 3600 operable to The apature works the same mixes the full flow with the bypass flow. Other examples of nozzle shapes, designs and venturi sections in general may be found in U.S. Pat. No. 5,965,637 to Jiang et al., the contents of which are incorporated herein by reference.

Now with reference to FIGS. 13 and 14, one form of the present invention contemplates that the reinforcing member 3400, the bypass channel 3410, ribs 3420, and vertical support members 3460 are preferably a unitary structure formed of a composite or plastic material such as thermoplastic. Other embodiments contemplate that the reinforcing member 3400, the bypass channel 3410, and ribs 3420 could be formed of multiple pieces coupled together.

It should be understood that the bypass filter media preferably comprises a stack of paper or cardboard disks each having a central aperture (able to be of circular, oval, oblong, hexagonal, octagonal or other shape). The term "disk stack" or "stack of disks" as used in the present patent application is aimed at covering any laminate structure constituted by superposition of several layers of filter medium in paper, cardboard or any other equivalent material, for example synthetic or inorganic fibers, able to take any geometric shape. The disks constituting the stack in question preferably include one or several holes. The holes in the disks may be either aligned or staggered, but in either case the holes preferably assume a columnar form, providing an interior filtered lubricant channel. The column is preferably centrally located, thus showing a central aperture at either end. However, it should be understood that locations other than central are contemplated as within the scope of the invention.

Similarly, it should also be understood that as used herein the term substantially adjacent to an end contemplates as within the scope of the invention that something might be the end, immediately next to the end, or might be slightly spaced apart from the end.

It should further be understood that connections other than threaded connections are contemplated as within the scope of the invention between, for example, the filter and the head. For example, the connection could be a quarter turn or bayonet style connection.

Additionally, it should be understood that while connecting segments 430, 1230, 3430 were described as forming axially spaced rings 440, 1240, 3440 it is contemplated that connecting segments could take other forms such as the zigzag or the offset relationship discussed above with reference to FIGS. 11 and 12. Additionally, the connecting segments 430, 1230, 2430, 3430 could be evenly spaced axially or different layers of connecting segments could be spaced at different axial distances. Still further, vertical support members could be placed between the axially spaced connecting segments to narrow the flow apertures and/or provide additional strength of the respective reinforcing members.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A filter cartridge for filtering fluid comprising:
    an annular full flow filter media extending axially between a first end and a second end and having an interior cavity defined therebetween;
    a reinforcing member positioned within the interior cavity and extending axially at least substantially between the first end and the second end, the reinforcing member including a plurality of axially spaced apart connecting segments;
    a bypass tube positioned within the interior cavity radially inward from the reinforcing member;
    a plurality of substantially axially extending ribs connecting the reinforcing member to the bypass tube, the ribs and the connecting segments defining a plurality of flow apertures in the reinforcing member; and
    a bypass filter media including a plurality of stacked disks extending between a top end and a bottom end, wherein each disk includes an aperture, the apertures in adjacent disks overlapping one another to define a channel extending between the bottom end and the top end; wherein the bottom end of the channel is positioned adjacent the bypass tube to define a flow path therebetween.

2. The filter cartridge of claim 1, further comprising a first endplate and a second endplate, wherein the reinforcing member is coupled between the first endplate and the second endplate, and wherein the bottom end of the bypass filter media engages the second endplate and the second endplate defines a flow opening fluidly connected to the channel.

3. The filter cartridge of claim 1, wherein a bottom end of the bypass tube extends into a venturi section connected to the plurality of substantially axially extending ribs, and wherein the ribs maintain each of the venturi section and the bypass tube in a centered concentric relation relative to the reinforcing member.

4. The filter cartridge of claim 3, wherein the reinforcing member, the plurality of substantially axially extending ribs, the bypass tube, and venturi section are integrally formed from plastic.

5. A combination full flow and bypass flow filter cartridge, comprising:
    a bypass media defining an internal flow channel that is fluidly connected to an axially extending bypass tube positioned within a centertube comprising a plurality of axially offset circumferential segments extending between a plurality of axially extending ribs, wherein the axial ribs extend from a bypass end to an outlet end and connect at least one of the circumferential segments to the bypass tube and at least one of the circumferential segments to a venturi nozzle, and wherein the bypass tube extends into the venturi nozzle and the centertube is positioned within a full flow media.

6. The filter cartridge of claim 5, wherein the ribs and connecting segments of the centertube are integrally formed from a plastic.

7. The filter cartridge of claim 6, wherein the centertube is integrally formed from plastic with the venturi nozzle and the bypass tube.

8. The filter cartridge of claim 5, wherein the plurality of connecting segments form a plurality of axially spaced apart rings, and wherein respective pairs of axially spaced apart rings and the plurality of axially extending ribs cooperate to define a plurality of flow apertures therebetween.

9. The filter cartridge of claim 5, wherein the ribs maintain each of the venturi nozzle and the bypass tube in a centered concentric relation relative to the centertube.

10. A filter apparatus for filtering fluid in an internal combustion engine, the filter apparatus comprising:
a substantially annular full flow filter media extending axially between a first end and a second end, wherein the full flow filter media surrounds a reinforcing member which extends axially between the first end and the second end, the reinforcing member including a plurality of axially spaced apart circumferential connecting segments, the segments extending between a plurality of substantially axially extending ribs, wherein the ribs connect the reinforcing member to a radially inwardly spaced bypass tube, and wherein the reinforcing member includes a plurality of flow apertures defined by the connecting segments and the ribs.

11. The filter apparatus of claim 10, wherein the reinforcing member, the bypass tube, and the ribs are integrally formed from plastic.

12. The filter apparatus of claim 10, wherein at least some of the plurality of connecting segments form a plurality of axially spaced apart rings.

13. The filter apparatus of claim 10, wherein the bypass tube includes an attachment portion extending axially at a first length beyond the first end, the attachment portion operable to engage a filter head.

14. The filter apparatus of claim 13, wherein the attachment portion includes a plurality of slots extending axially from an outermost end of the attachment portion toward the first end of the reinforcing member at a second length, wherein the second length is less than the first length.

15. The filter apparatus of claim 10, wherein the flow apertures are sized to prevent fluid being filtered from blowing the full flow filter media therethrough.

16. The filter apparatus of claim 10, further comprising a plurality of axially extending vertical support members coupled to the connecting segments.

17. The filter apparatus of claim 10, further comprising a venturi nozzle positioned within the reinforcing member and connected thereto by the plurality of substantially axially extending ribs.

18. A combination full flow and bypass filter apparatus comprising:
a centertube extending axially between a first end and a second end, the centertube including a plurality of flow apertures;
a substantially annular full flow filter media surrounding the centertube;
a bypass tube positioned within the centertube;
a plurality of ribs connecting the centertube to the bypass tube, the ribs extending axially along at least a substantial portion of the centertube; and
a bypass filter media including a plurality of stacked disks extending between a top end and a bottom end, wherein each disk includes an aperture, the apertures in adjacent disks overlapping one another to define a channel extending between the bottom end and the top end; wherein the bottom end of the channel is fluidly connected to the bypass tube.

19. The filter apparatus of claim 18, wherein the centertube includes a plurality of axially spaced apart circumferential connecting segments, wherein the plurality of flow apertures are defined by the connecting segments and the ribs.

20. The filter apparatus of claim 19, wherein the plurality of connecting segments form a plurality of axially spaced apart rings.

21. The filter apparatus of claim 20, wherein the plurality of axially spaced apart rings are evenly spaced axially relative to one another.

22. The filter apparatus of claim 19, wherein the plurality of connecting segments are circumferentially offset from one another such that respective connecting segments cooperate to define a zig-zag relationship therebetween.

23. The filter apparatus of claim 18, wherein the bypass tube includes an attachment portion extending axially at a first length beyond the first end, the attachment portion including a plurality of slots extending axially from an outermost end of the attachment portion towards the first end at a second length less than the first length, and wherein the attachment portion is operable to engage a filter head.

24. The filter apparatus of claim 18, wherein a bottom end of the bypass tube extends into a venturi section connected to the plurality of substantially axially extending ribs, and wherein the ribs maintain each of the venturi section and the bypass tube in a centered concentric relation relative to the reinforcing member.

* * * * *